United States Patent [19]

Sand

[11] Patent Number: 5,377,718
[45] Date of Patent: Jan. 3, 1995

[54] SELECTING AND DISPENSING VALVE

[75] Inventor: William F. Sand, Cincinnati, Ohio

[73] Assignee: Hydro Systems Company, Cincinnati, Ohio

[21] Appl. No.: 89,249

[22] Filed: Jul. 9, 1993

[51] Int. Cl.⁶ ............................................. F16K 11/02
[52] U.S. Cl. ............................ 137/625.11; 137/625.41; 137/893
[58] Field of Search ................ 137/625.11, 625.41, 137/625.46, 893

[56] References Cited

U.S. PATENT DOCUMENTS

| | | | |
|---|---|---|---|
| 2,455,625 | 12/1948 | Trantin, Jr. | 138/46 |
| 2,649,113 | 8/1953 | Cizek | 137/601 |
| 2,912,011 | 11/1959 | Burg | 137/625.3 |
| 2,924,207 | 2/1960 | Hottenroth | 137/625.11 |
| 3,067,768 | 12/1962 | Burg | 137/468 |
| 3,072,137 | 1/1963 | McDougall | 137/216 |
| 3,089,505 | 5/1963 | Forster | 137/270 |
| 3,166,086 | 1/1965 | Holmes | 137/217 |
| 3,240,230 | 3/1966 | Callahan, Jr. et al. | 137/608 |
| 3,256,909 | 6/1966 | Obidniak et al. | 137/625.3 |
| 3,443,592 | 5/1969 | Felmlee | 137/625.11 |
| 3,586,049 | 6/1971 | Adamson | 137/625.4 |
| 3,687,163 | 8/1972 | Nickels | 137/625.1 |
| 3,762,439 | 10/1973 | Heath | 137/549 |
| 3,810,787 | 5/1974 | Yoeli et al. | 134/29 |
| 3,837,360 | 9/1974 | Bubula | 137/625.11 X |
| 3,940,107 | 2/1976 | Allenbaugh, Jr. | 251/297 |
| 3,957,082 | 5/1976 | Fuson et al. | 137/625.4 |
| 4,130,128 | 12/1978 | Kaneko | 137/269 |
| 4,178,963 | 12/1979 | Riefler et al. | 137/624.1 |
| 4,241,896 | 12/1980 | Voege | 251/206 |
| 4,276,001 | 6/1981 | Holmes | 417/401 |
| 4,407,444 | 10/1983 | Knebel et al. | 236/12.1 |
| 4,427,176 | 1/1984 | Livet | 251/68 |
| 4,446,887 | 5/1984 | Redmon et al. | 137/556 |
| 4,538,636 | 9/1985 | Cleland | 137/216 |
| 4,643,215 | 2/1987 | Philpot et al. | 137/15 |
| 4,655,246 | 4/1987 | Philpot et al. | 137/505.1 |
| 4,794,950 | 1/1989 | Gratzmuller | 137/596.1 |
| 4,815,634 | 3/1989 | Nowicki | 222/133 |
| 4,934,651 | 6/1990 | Nowicki | 251/54 |
| 5,123,449 | 6/1992 | Nowicki . | |

Primary Examiner—Robert G. Nilson
Attorney, Agent, or Firm—Wood, Herron & Evans

[57] ABSTRACT

An improved selector valve includes a sealing disc with a sealing face biased against an opposed sealing face of a port plate. The sealing disc has a blind slot located in the sealing face which communicates with an outlet port and a single selected inlet port on the port plate, while simultaneously sealing off all other inlet ports. Detents define the angular radial disposition of the slot for indicating which inlet port is selected. A venturi eductor has a suction passage sealed directly to the port plate outlet for connecting the venturi directly to a selected inlet port.

18 Claims, 2 Drawing Sheets

SELECTING AND DISPENSING VALVE

BACKGROUND OF THE INVENTION

This invention relates to dispensers and more particularly to a selector valve for selection of one of a plurality of fluids for dispensing or mixing with another fluid through a venturi eductor system.

Such selector valves typically allow an operator to select and dispense one particular chemical or fluid at a time, while closing off access to any of the other fluid sources available for selection.

One such prior selector valve typically included a static body having several inlet ports and one outlet port, and a rotatable valve core with passages to allow selective connection of a selected inlet port with the outlet port. Sealing was provided by a spring loaded, o-ring sealed, Teflon plunger carried in the rotatable core and bearing against the face of the static member.

While such selector valves allow selective connection and dispensing, they have several inherent disadvantages.

First, such valves have parts that are vulnerable to the undesirable effects of the dispensed chemicals, such as abrasion or chemical attack. When chemicals come in contact with o-ring seals, for example, this can erode the o-rings and cause the seal to weaken over time. Therefore, these o-rings occasionally must be checked and replaced.

Second, it is important to be able to efficiently change over from one selected chemical to another. The volume of the prior chemical in the system which must be purged delays the dispensing of the second chemical in unadulterated form. Thus, because of the distance the selected fluid must travel within the selector valve system, the system may contain a significant amount of residual chemical after the user has selected a new inlet port, requiring the user to spend time purging the line.

BRIEF SUMMARY OF THE INVENTION

Accordingly, it has been one objective of this invention to provide an improved selector valve.

A further objective of the invention has been to provide a selector valve which does not require separate seals for operation.

A further objective of the invention has been to provide a selector valve wherein any chemical remaining in the valve or valve system on change over is reduced.

To these ends, a preferred embodiment of the invention includes a selector valve having a sealing disc with a flat sealing face, biased against an opposed flat sealing face of a port plate. The port plate has a central outlet port and a plurality of inlet ports disposed about the outlet port. A blind slot is located in the sealing face, extending radially from the center of the face out toward its periphery. The slot communicates with an outlet port and a single selected inlet port on the port plate, depending on the orientation of the disc and port plate, while simultaneously sealing off all other inlet ports. This construction produces an efficient seal, yet eliminates the use of additional component seal parts that are vulnerable to undesirable influence by chemicals.

This preferred embodiment also includes a venturi eductor assembled on the valve. The eductor includes a venturi passage and a suction passage leading from the venturi. The port plate is connected to the eductor by a projection forming the suction passage and extending from the eductor system. Because of the close proximity of the port plate and eductor, there is little room for residual chemicals in the system, which reduces flush or purge time.

These and other objectives and advantages will become readily apparent from the following detailed description of a preferred embodiment of the invention and from the drawings in which:

DETAILED DESCRIPTION

Figure 1:
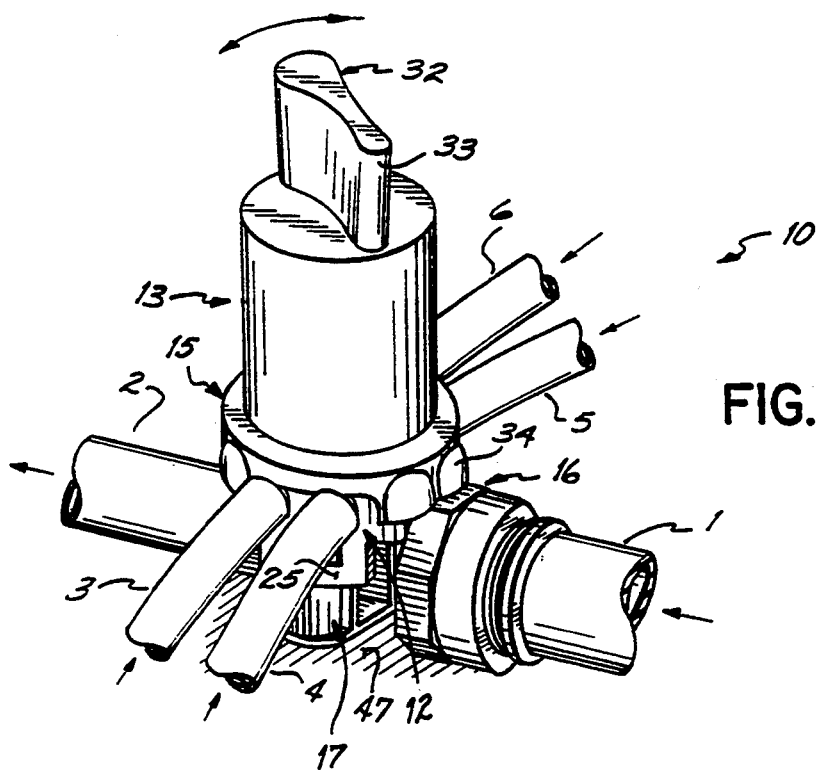
FIG. 1 is a perspective view of a selector valve and eductor according to a preferred embodiment of the invention.

A selector valve 10, according to the preferred embodiment of the invention, is illustrated in FIG. 1. As shown in FIG. 1, the selector valve 10 is disposed in a dispensing or proportioning system including a water inlet or hose 1 and a discharge outlet hose 2, connected to respective ends of venturi eductor 16, as will be described.

The valve is operably connected through input lines 3, 4, 5, 6 to respective sources of chemicals or fluids to be selected and proportioned by venturi action for discharge through the outlet hose 2. In FIG. 1, arrow "A" indicates an incoming flow of water or fluid into inlet 1, arrows "B", "C", "D" and "E" indicate flow of chemicals or fluids into valve 10, and arrow "F" indicates the discharge flow of water or fluid combined with one of the chemicals represented by flows B, C, D or E.

Of course, a fluid other than water may be used from inlet 1 to draw chemicals or fluid through a selected input lines 3–6 and, intermixed, carry the selected chemicals to discharge line 2. The actual flow of fluid in inlet 1 may be controlled by separate valve means, not shown. Moreover, it will be appreciated that the selected chemicals may be measured or proportioned by means of orifices disposed at the chemical sources in the input lines 3–6 or in the valve structure 10.

Figure 2:
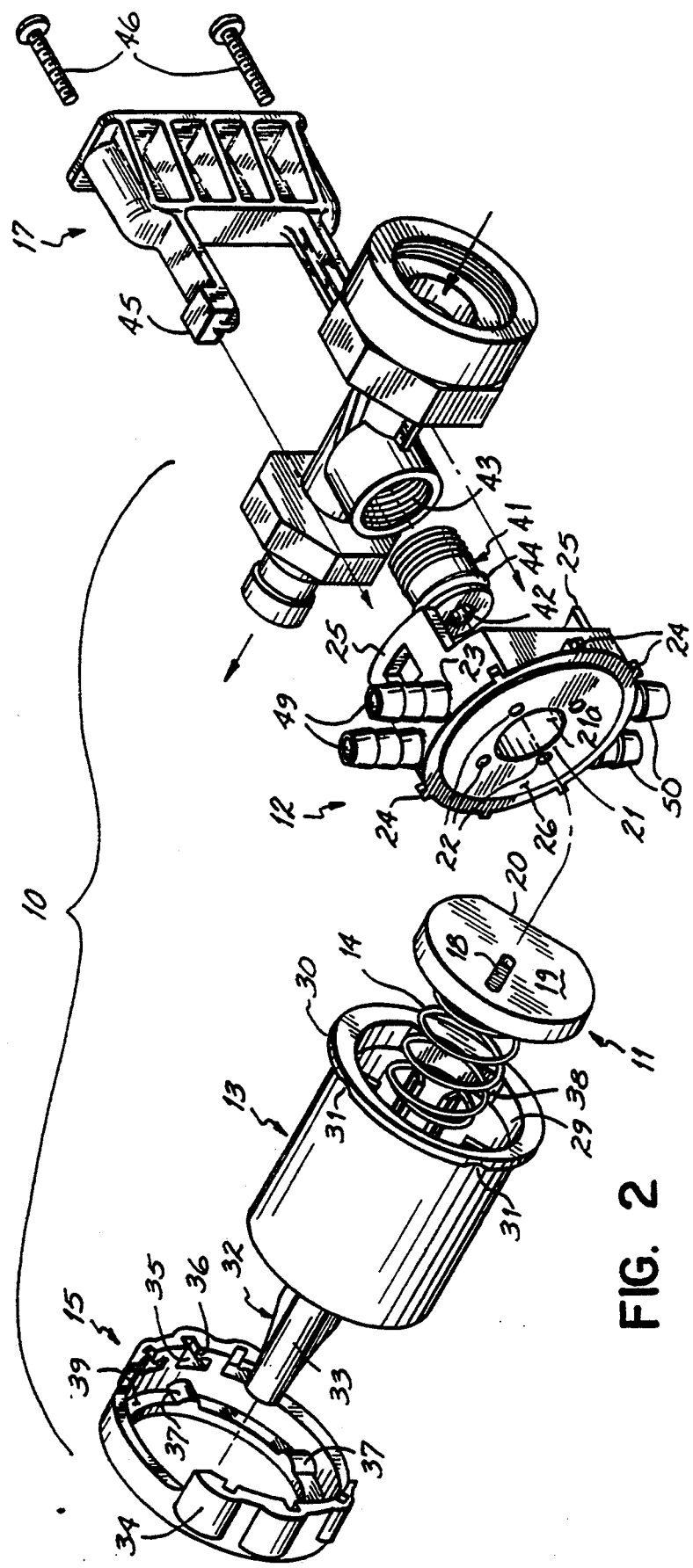
FIG. 2 is an exploded view of the component parts of the selector valve and eductor of FIG. 1.

Turning now to a more detailed description of valve 10, as shown in FIGS. 2-5, the selector valve includes a sealing disk 11, a valve port plate 12, a rotatable knob 13, a spring 14, a retaining ring 15, an eductor 16, and a bracket 17 (FIGS. 1 and 2).

Considering first the sealing disk 11, its various components are shown in FIG. 2. The sealing disk 11 is preferably flat with a circular edge or periphery 11a. It includes a recessed blind channel or slot 18 disposed in a sealing face 19, and an edge flat 20, disposed in the otherwise circular periphery. According to the preferred embodiment of the invention, sealing disk 11 is preferably manufactured from Teflon. Other materials may be used, such as ceramic or polyethylene.

Figure 4:
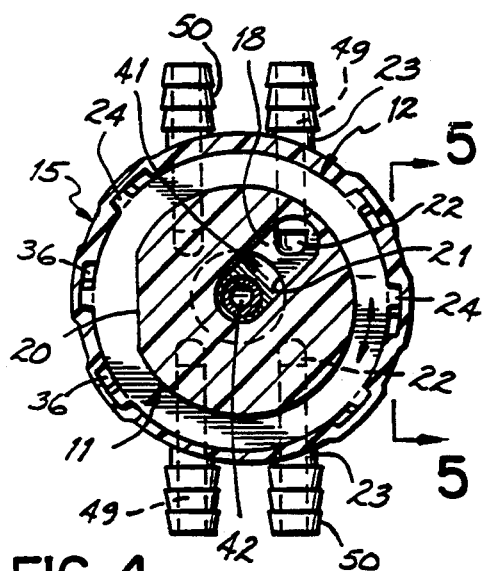
FIG. 4 is a cross sectional view taken along lines 4—4 of FIG. 3.

The valve port plate 12 includes a central outlet port 21, an outlet passage 21a, and several inlet ports 22 radially oriented with respect to the outlet port 21. These inlet ports 22 communicate with peripheral ports 23, located on the periphery of the valve port plate 12, through inlet passageways 49 (FIG. 4). The valve port plate 12 further includes lugs 24 extending radially from the periphery of the port plate 12, locking flanges 25 for securing the valve port plate 12 to the bracket 17, and a ported, flat face 26 disposed against the sealing face 19 of the sealing disk 11. In a preferred embodiment, the port plate is manufactured with reinforced polypropylene. The use of TEFLON and reinforced polypropylene in the valve disk 11 and port plate 12 provides good chemical resistance and good sealing with smooth valve movement at the fluidal suction pressures used, generally in the range of 14 psi, but which may vary.

When the sealing disk 11 is disposed upon the valve port plate 12, it allows selective communication of a selected inlet port 22 with the central outlet port 21, while sealing off the remaining unselected inlet ports.

The selector valve 10 further includes a rotatable knob 13 and biasing means or spring 14. The knob is manually operated to rotate the sealing disk 11 on the valve port plate 12 to select a particular inlet port 22.

Figure 3:
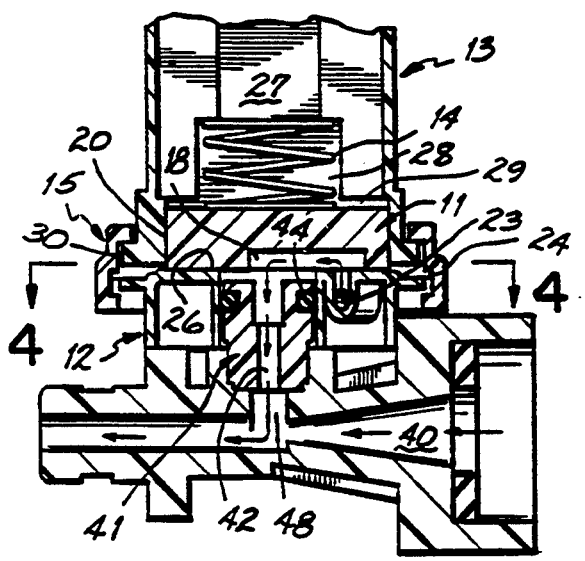
FIG. 3 is a cross sectional side view of the preferred embodiment of FIG. 1.
Figure 5:
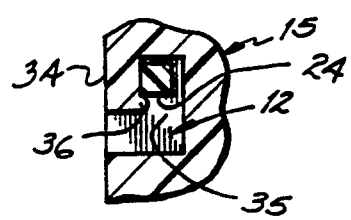
FIG. 5 is a cross sectional view taken along lines 5—5 of FIG. 4 and showing a locking means for securing the selector valve's rotatable knob to the valve port plate.

The rotatable knob 13 has a hollow interior 27 (FIG. 3), a spring housing 28, and a disc receiving recess 29 (FIGS. 2 and 3). The disc receiving recess 29 includes a flat 38 (FIGS. 2 and 3) that cooperates with the sealing disc peripheral edge flat 20, allowing the user to turn the sealing disk 11 by rotating the knob.

The rotatable knob 13 further includes a radially projecting external flange 30 having an upper surface with depressions 31. A handle 32 is provided for grasping and rotating the knob 13. The handle 32 has a tapered end 33 (FIG. 1) which is always aligned with the blind slot 18 on the sealing disk 11. Therefore, the tapered end 33 will always point toward the selected inlet port 22. In other words, the tapered end 33 always points radially in the same angular direction as the radial extension of slot 18. This is perhaps best illustrated in FIG. 2 where these dispositions of handle 32 and slot 18 can be compared.

Selector valve 10 also includes a retaining ring 15. The retaining ring 15 has a depending skirt 34 with an internal surface which includes several locking channels including recesses 35 and protrusions 36. The retaining ring 15 also includes a radially inwardly extending rim surface 39 with several radially oriented protrusions 37 (FIG. 2). Skirt 34 depends from an outer periphery of rim surface 39.

The interior rim surface 39 of the retaining ring 15 sits on the external flange 30 of the rotatable knob 13 when the valve 10 is assembled. Lugs 24 on the port plate 12 are received within recesses 35 on the retaining ring skirt 34 and are locked by protrusions 36. When so connected, the ring 15 holds the rotatable knob 13 on the valve port plate 12.

The projections 37 on ring 15 are spaced so as to be aligned with the depressions 31 on the upper surface of flange 30 at the base of the rotatable knob 13, creating a detenting action as the rotatable knob 13 is turned (FIG. 2). When the projections 37 align with the depressions 31, creating the detenting action, the user knows that the recessed slot 18 on the sealing disk 11 is angularly aligned or disposed over one of the inlet ports 22 on the valve port plate 12 (FIG. 4), and the central outlet port 21.

The seal between the sealing disc 11 and the valve port plate 12 is created by the biasing means on spring 14. In a preferred embodiment of the invention this biasing means on spring 14 (FIGS. 2 and 3) is situated in a spring housing 28 (FIG. 3), creating an opposing and outward force against the sealing disc 11 (FIGS. 2 and 3). Sealing disc 11 is axially movable in recess 29 so that it can be urged outwardly of knob 13. Moreover, it will be appreciated that the spring force against sealing disc 11 not only serves to operably seal it against the port plate 12, but to urge the knob away from the port plate so the projections 37 are urged, releasably, into the depressions 31 on the knob flange 30. This provides a suitable tactile detent as described. Also, it will be appreciated that the disc flat 20, flat 38 in recess 29, the detents, and the angular disposition of handle 32 and slot 18 are all so indexed with the angular positions of inlet ports 22 to provide a positive detent to position the valve when a particular port is selected. Of course the position of lugs 24 on the port plate 12 and the locking channels having recesses 35 on the retaining ring 15 are likewise indexed to insure proper port alignment at the detent positions.

A preferred embodiment of the invention also includes an eductor 16 mounted directly to port plate 12. A bracket 17 is used to secure the eductor 16 to the valve port plate 12 (FIG. 2). The eductor 16 has a venturi 40 (FIG. 3) and an eductor plug 41 with an orifice or passage 42 (FIG. 2). The plug 41 and orifice 42 define in part the venturi suction passage 48. The base of the eductor plug 41 is threaded and fits into an eductor plug port 43 on the side of the eductor 16. The opposite end of the eductor plug 41 has a rubber seal 44 around the periphery (FIG. 2), for creating a seal between the eductor plug 41 and the central outlet port 21 in valve port plate 12. In a preferred embodiment of the invention, the eductor and venturi will create a suction with an eductor pressure of approximately 14 psi.

In addition, the selector valve 10 includes a bracket 17 which couples to the valve port plate 12, securing the eductor 16 to the valve port plate 12. The bracket 17 has resilient locking arms with projections 45 which engage the openings on locking flanges 25 on the valve port plate 12 (FIG. 2). Screws 46 (FIG. 2) may be used to mount the combined valve and eductor on a mounting surface 47 (FIG. 1).

As a result of the sealing engagement between the flat faces of the sealing disc 11 and the valve port plate 12, there is no need for the use of additional o-rings or seal components. The seal is created by directly biasing the sealing disc 11 against the ported face 26 of the valve port plate 12 (FIG. 2).

In use, the selector valve user will select a particular inlet port. 22 by turning the rotatable knob 13 and orienting the tapered end 33 of the handle 32 toward one of the peripheral ports 23 on the valve port plate 12. This action will move the blind slot 18 over the inlet port associated with that inlet while simultaneously sealing off the unselected inlet ports 22 on the ported face 26 of the valve port plate 12. The selected inlet port 22 and the central outlet port 21 communicate through the recessed slot 18 in the sealing face 19 of the sealing disk 11 (FIGS. 2 and 4).

When water or other fluid is caused to flow into eductor 16, it flows through venturi passage 40, creating a pressure drop in venturi suction passage 48. This suction is communicated through the passage 48, and passage 41 to outlet port 21 and from these, through slot 18 to the selected chemical source for pulling that chemical into the venturi passage for mixing and discharge.

In use, then a chemical or other fluid will be drawn up through the selected peripheral port 23 (FIG. 4) which communicates with the selected inlet port 22 via the selected inlet passage 49 (FIG. 2 and FIG. 4). In a preferred embodiment of the invention, the peripheral ports 23 will connect with the source chemicals or fluids through the use of hoses from the sources connected with hose connection barbs 50 (FIGS. 2 and 4).

The user will know that the chosen inlet port 22 is properly selected because of the detenting action created between the depressions 31 at the base of the rotatable knob 13 and the projections 37 along the interior rim surface 39 of the retaining ring 15. The depressions 31 and protrusions 37 will create a position detent when they are in alignment. This will signal to the user that the recessed slot 18 in the sealing disk 11 is properly aligned with the selected inlet port 22 on the valve port plate 12. (FIGS. 2 and 4).

Another advantage of the selector valves made according to the invention is the shortened distance between the valve port plate 12 and the eductor 16, reducing the time needed to purge residual chemical from the selector valve system. As the selected fluid moves through the selected peripheral port 23 into the inlet passage 49, through the selected inlet port 22, across the recessed slot 18, down through the central outlet port 21, through the eductor plug 41 with orifice 42, into the eductor 16, the fluid has a shorter distance to travel because of the compactness and close proximity of the valve port plate 12 and the eductor 16 (FIGS. 2 and 3). No hoses or lengthy traverses are required between valve 10 and eductor 16. This shortened distance reduces the amount of residual chemical in the system when the user selects a new inlet port. Because of the reduction in residual chemical, the user spends less time purging the system.

These and other advantages and modifications will become readily apparent to those of ordinary skill in the art without departing from the scope of this invention, and the applicant intends to be bound only by the claims appended thereto.

I claim:

1. A selector valve comprising:
    a port plate having a flat face;
    at least one outlet port and at least two inlet ports in said face, said inlet ports being disposed about said outlet port;
    a sealing disc having a flat sealing face for disposition in engagement with said port plate face;
    said flat sealing face of said sealing disc engaging and sealing against said port plate face;
    said sealing disc being rotatable about an axis;
    a knob for rotating said disc about said axis, said disc being operably engaged by said knob for rotation and said disc being movable, with respect to said knob, in a direction parallel to said axis,
    said sealing disc having a channel in said sealing face, said channel extending radially outward in said face with respect to said axis; and
    said disc being rotatable with respect to said port plate for interconnecting a selected inlet port with said outlet port through said channel while other inlet ports are blocked by said flat sealing face of said sealing disc.

2. A selector valve as in claim 1 including an outlet port disposed in the center of said port plate.

3. A selector valve as in claim 1 including an outlet passage and wherein said outlet port in said face communicates with said passage.

4. A selector valve as in claim 3 including inlet passages in said port plate and wherein said inlet ports communicate with said inlet passages, said inlet passages being connectable to respective external sources of fluid.

5. A selector valve as in claim 4, including means for connecting said inlet passages to respective fluid sources.

6. A selector valve as in claim 1 wherein said port plate includes four inlet ports.

7. A selector valve as in claim 1 wherein said valve includes a means for biasing said disc against said port plate for sealing said channel to the outlet port and a selected inlet port.

8. A selector valve comprising:
    a port plate having a flat face;
    at least one outlet port and at least two inlet ports in said face, said inlet ports being disposed about said outlet port;
    a sealing disc having a flat sealing face for disposition in engagement with said port plate face;
    said flat sealing face of said sealing disc engaging and sealing against said port plate face;
    said sealing disc being rotatable about an axis;
    a knob for rotating said disc about said axis, said disc being operably engaged by said knob for rotation and said disc being movable, with respect to said knob, in a direction parallel to said axis,
    said sealing disc having a channel in said sealing face, said channel extending radially outward in said face with respect to said axis; and
    said disc being rotatable with respect to said port plate for interconnecting a selected inlet port with said outlet port through said channel while other inlet ports are blocked by said flat sealing face of said sealing disc, and
    wherein said valve further includes an elongated knob member;
    said knob member having a hollow interior defining a spring housing and a disc receiving recess;
    said recess having a cylindrical shape corresponding to said sealing disc and having an internal flat surface;
    said disc having a peripheral circular edge and a flat surface in said edge for cooperating with the internal flat surface of said knob for turning of said disc by said knob.

9. A selector valve as in claim 8 wherein said disc is movable axially along said knob recess and said knob further includes means for biasing said sealing disc toward said port plate for sealing said sealing disc face against said port plate face.

10. A selector valve as in claim 9 further including an external flange at the lower end of the knob.

11. A selector valve as in claim 10 wherein said valve further includes a retaining ring disposed over said elongated knob, said ring having a radially disposed rim surface for engagement with said external flange.

12. A selector valve as in claim 11 wherein said retaining ring further comprises a skirt depending from said rim surface, said skirt having an internal surface and including a plurality of locking channels therein.

13. A selector valve as in claim 12 further including lugs projecting from said port plate for cooperating with the locking channels in said retaining ring to secure said ring onto said port plate for holding said knob, biasing means and disc in operative position with respect to said port plate.

14. A selector valve as in claim 13 wherein an upper surface of said external flange and the rim surface of said retaining ring are disposed face to face;
said flange and retaining ring comprising a detenting means for defining separate operable positions of said knob and disc with respect to said port plate.

15. A selector valve comprising:
a port plate having an outlet port and a plurality of inlet ports in a face thereof;
means for interconnecting said inlet ports with external sources of fluid;
said inlet ports spaced radially with respect to said outlet port;
a sealing disc having a sealing face;
a blind, radially oriented slot in said sealing face;
said sealing face of said sealing disc disposed in sealing engagement with said port plate face;
a knob means for receiving said disc and rotating said disc about an axis and with respect to said port plate, said disc being movable with respect to said knob means in a direction parallel to said axis;
a locking means for rotatably securing said knob means and said port plate; and
means for urging said disc away from said knob means and against said port plate, such that said knob is operable to rotate said disc to selectively connect one of said inlet ports to said outlet port while with said sealing face of said sealing disc sealing off the remaining said inlet ports.

16. A selector valve comprising:
a port plate having an outlet port and a plurality of inlet ports in a face thereof;
means for interconnecting said inlet ports with external sources of fluid;
said inlet ports spaced radially with respect to said outlet port;
a sealing disc having a sealing face;
a blind, radially oriented slot in said sealing face;
said sealing face of said sealing disc disposed in sealing engagement with said port plate face;
a knob means for receiving said disc and rotating said disc about an axis and with respect to said port plate, said disc being movable with respect to said knob means in a direction parallel to said axis;
a locking means for rotatably securing said knob means and said port plate; and
means for urging said disc away from said knob means and against said port plate, such that said knob is operable to rotate said disc to selectively connect one of said inlet ports to said outlet port while with said sealing face of said sealing disc sealing off the remaining said inlet ports, and wherein:
said port plate includes lugs extending radially from a periphery of said plate; and
said locking means has a plurality of channels receiving said lugs for securing said knob and disc to said port plate.

17. A selector valve in claim 16 wherein:
said sealing disc includes a peripheral flat; and
said knob means includes a hollow interior defining a disc receiving recess;
said recess having a shape corresponding to said disc and having a flat for cooperating with said disc flat, for turning said disc when knob turns.

18. A selector valve as in claim 17 wherein:
said knob means has a plurality of depressions at base of said knob; and
said locking means has a plurality of detent projections corresponding with said knob depressions, and defining a detenting means;
said detent projections being radially oriented and indexed to the radial position of said inlet ports, such that the detent means tactilely indicates the alignment of said sealing disc slot with one of said inlet ports.

* * * * *